Figure 1:
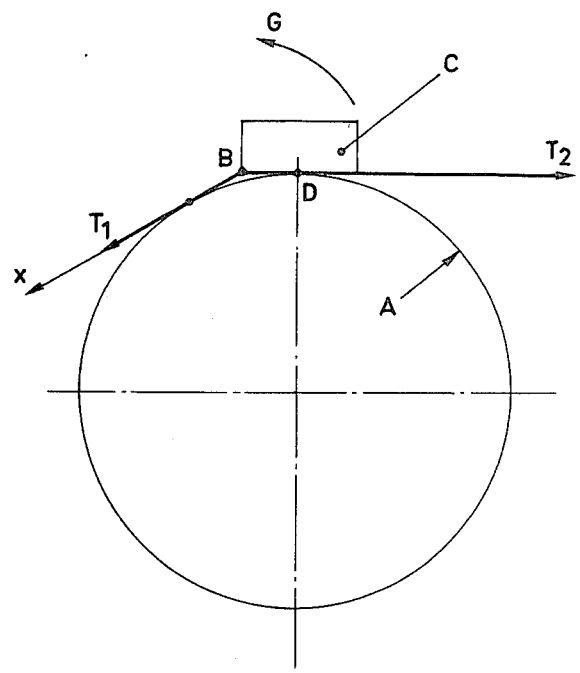

United States Patent [19]

Bernède

[11] 4,221,030
[45] Sep. 9, 1980

[54] CLAMP RING

[75] Inventor: Rémy J. Bernède, Vaucresson, France

[73] Assignee: Etablissements Caillau, Boulogne-Billancourt, France

[21] Appl. No.: 952,256

[22] Filed: Oct. 17, 1978

[30] Foreign Application Priority Data

Dec. 2, 1977 [FR] France .............................. 77 36295

[51] Int. Cl.² .............................................. B65D 63/00
[52] U.S. Cl. ................................ 24/274 R; 24/16 PB
[58] Field of Search .......... 24/274 R, 274 P, 274 WB, 24/16 PB

[56] References Cited

U.S. PATENT DOCUMENTS

| 2,384,094 | 9/1945 | Jamie | 24/274 R |
| 3,189,968 | 6/1965 | Henning | 24/274 P |
| 4,047,268 | 9/1977 | Buttriss | 24/274 R |

FOREIGN PATENT DOCUMENTS

| 336007 | 2/1904 | France | 24/274 R |
| 78701 | 7/1962 | France | 24/274 P |
| 408567 | 9/1966 | Switzerland | 24/274 P |
| 455907 | 10/1936 | United Kingdom | 24/274 R |
| 567031 | 1/1945 | United Kingdom | 24/274 R |
| 607598 | 9/1948 | United Kingdom | 24/274 P |
| 877158 | 9/1961 | United Kingdom | 24/274 R |

Primary Examiner—J. Franklin Foss
Attorney, Agent, or Firm—Young & Thompson

[57] ABSTRACT

This clamp ring comprises a strip provided at one end with a series of transversally extending ridges or like profiles and carry at its other end a housing for a rotatably mounted screw which engages said ridges for tightening the ring. The housing has a straight bottom supporting the ridged part of the strip and said housing is disposed relative to the ring such that the first operative screwthread of the screw is disposed substantially on a diametral plane of the ring, while the screw extends tangentially to the circumference formed by the ring and substantially perpendicularly to said diametral plane. The ridges are produced by stamping or pressing and are in the form of a sector of a nut. The rack is displaced outwardly of the plane of the strip, which comprises two planar side portions flanking an offset central portion providing a guide groove in the lower face of the strip, which co-operates with a corresponding raised portion provided in the bottom of the housing.

11 Claims, 9 Drawing Figures

CLAMP RING

GENERAL DISCLOSURE

The present invention relates to clamp rings of the type commonly referred to as jubilee clips and comprising a strip, usually a metal strip, which is so shaped at one end as to provide a series of transversely extending slots, ridges or like profiles and which at its other end carries a housing in which there is rotatably mounted a screw which is disposed tangentially with respect to the ring and whose screwthreads are engaged with the ridges of the strip to enable the ring to be tightened on to an object such as a pipe. The invention more particularly concerns clamp rings of this type, which are capable of applying a substantial clamping force.

It is known that, in order to improve the clamping action and in particular to be able to increase the clamping power of a clamp ring, it is necessary to devise a construction in which all the screwthreads of the screw are engaged with the ridges. Various constructions have already been proposed for achieving this result, in particular using a housing which has a flat bottom such as disclosed in U.S. Pat. No. 2,384,094, but this problem is not the only problem which must be overcome in order to permit a high clamping force to be effectively applied to the ring.

It has in fact been found that, in the known rings, there is a rocking couple which is linked to the forces produced in the two ends of the strip of the ring, and to their points of application. This condition is shown in accompanying FIG. 1 which diagrammatically illustrates a clamp ring A and which also shows the traction force $T_1$ which is applied at the location of the first screwthread of the screw, in a direction BX, and which, together with the force $T_2$ applied by the other end of the strip, generates a couple acting on the housing C of the ring, at point D. Under the effect of this couple, the housing C then tends to rock about the point D in the sense indicated by arrow G, so as to cause the line BX to pass through the point D. It will be seen that this rocking couple detrimentally affects the uniformity of the clamping action which can be produced.

In consequence, an object of the invention is to provide a ring of this type, comprising a screw of generally cylindrical form, in which all the screwthreads are engaged with the shaped configurations of the strip, in order in this way to increase the clamping force which can be produced, but limiting the rocking moment of the casing which results from its tangential positioning relative to the general configuration of the ring.

Practical experience also shows that, in a clamp ring of the general type considered herein, there is a tendency for the strip of the ring to 'twist up', because of the force applied thereto by the screwthreads of the screw, when a substantial clamping force is applied, in particular in the case of strips which are slotted to form the ridges.

Another object of the invention is to overcome this disadvantage in providing a clamp ring comprising a strip which is provided at one end with a series of transversely extending ridges or like profiles and which towards the other end carries a housing in which there is rotatably mounted a screw whose screwthreads are engaged with the ridges of the strip to provide for tightening of the ring, wherein the housing has a straight bottom which serves as a support for the ridged part of the strip in order to hold all the screwthreads of the screw engaged with the ridges of the strip, and wherein the housing is disposed relative to the ring that the first operative screwthread of the screw is disposed substantially on a diametral plane of the ring, the screw extending tangentially to the circumference formed by the ring and substantially perpendicularly to the said diametral plane.

As the first operative screwthread of the screw is positioned substantially on a diametral plane of the ring, which tends to bring the points B and D in FIG. 1 into a condition of coincidence, and as the screw is oriented perpendicularly relative to this diametral plane, the rocking moment of the casing is very greatly reduced.

According to another object of the invention, the ridges are preferably formed by raised portions which form a rack and which are produced by stamping or pressing. The provision of raised ridges of this kind, instead of the slots which are usually provided, increases the strength of the strip, which is important in the case of a ring which is intended to apply a high clamping force. In addition, the operation of stamping out or pressing the rack provides this part of the strip, when viewed in right cross-section, in combination with the unstamped edge portions of the strip, a dovetail-shape configuration or a configuration having a central portion which is displaced, forming a guide groove.

According to still another object of the invention, a raised, shaped portion is provided in the base of the housing, the dimensions of the raised, shaped portion substantially corresponding to those of the guide groove of the strip, whereby the raised, shaped portion mates slidably in the groove and the strip bears against the bottom of the housing by way of the raised, shaped portion which thus directly supports the rack. This construction thus provides a very good support for the strip, which thus prevents any twisting of the strip, even under the effect of a high clamping force.

The transverse shaping of the strip can extend over the whole length of the strip. In this case, when the ring is tightened around a pipe of rubber or similar material the material of the pipe on the two sides of the strip not only flows outwardly but also flows to the internal cavity provided by the above-mentioned shaping of the strip, which thus provides for better transverse positioning of the ring on the pipe, preventing any inopportune movement or sliding, as well as providing a good sealing action.

According to a further object, if as appears appropriate the housing is fixed on the strip by a hooking engagement on an offset, bridge portion of the strip, the offset bridge portion also has on its upper face a raised, shaped portion. Thus, the strip is guided over the whole length of the housing, both at its bottom and at the portion forming the offset, bridge part of the strip. It will also be noted that the offset, bridge portion provides for a connection without any sliding movement between the housing and the strip, by virtue of the particular configuration of the latter.

According to another object of the invention, towards the entry end of the housing or casing there is provided a tongue portion for facilitating the entry of the strip into the casing which tongue portion may or may not project relative to the casing and also being provided with a configuration forming the beginning of the raised, shaped portion, thereby further improving the strip guiding action.

If the end of the strip which carries the casing is extended beyond the casing, forming a bib portion which bears against the pipe or other object to be clamped, in particular in line with the configuration which is intened to come into engagement with the screw, it is also possible to provide on the above-mentioned bib portion an incipient raised, shaped portion to facilitate introducing the strip into the casing in the correct position. Such a shaped portion also makes it possible to improve the circular nature of the clamping action, by substantially eliminating any gap between the bib portion and the shaped portion of the strip of the ring.

According to still another object of the invention, at its exit end, the base of the casing has a portion which is bent or curved inwardly, forming a stiffening member for the casing base, and which preferably bears on the strip. The bent portion may be disposed opposite a deflector nose portion which is provided in known manner to deflect the strip, thus forming an exit or guide slot for the strip.

The head of the screw may be of any desired form, for example a hexagonal head. In an alternative form, it is possible to eliminate a projecting screw head, by providing a drive recess in the body of the screw, for example a hexagonal recess, in which case an opening provided at the rear of the casing enables an operating tool to be inserted into the recessed head. Such an arrangement thus eliminates any projection at that end of the casing.

The invention will be better understood from the following description with reference to the accompanying drawings which are given by way of non-limiting example.

Figure 2:
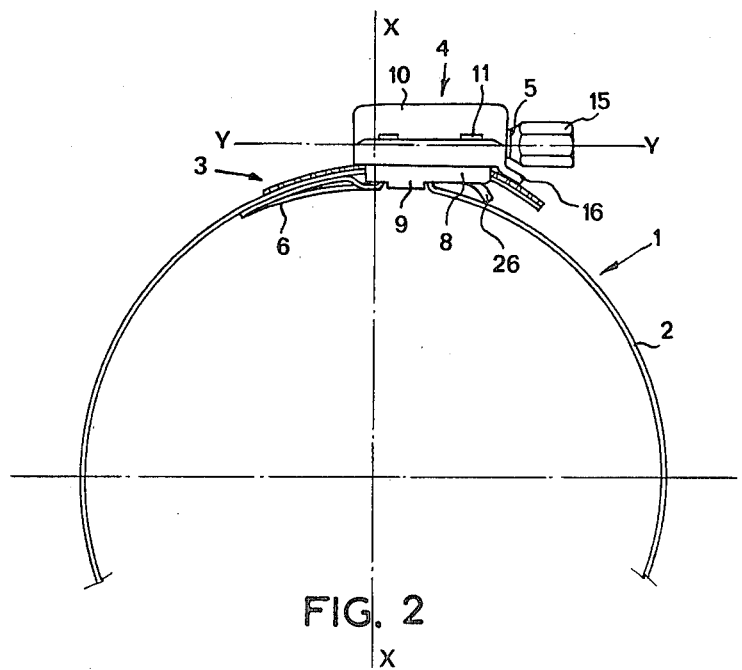
Figure 3:
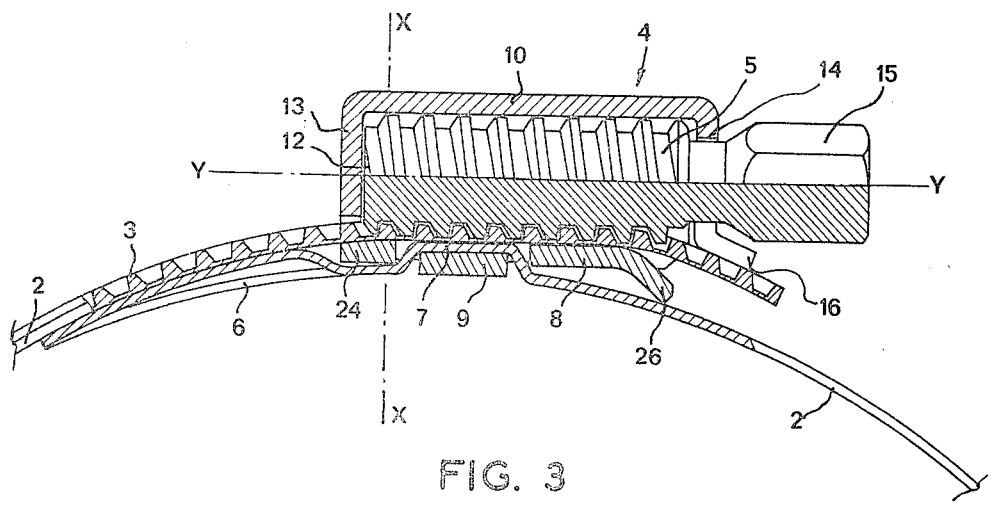
Figure 5:
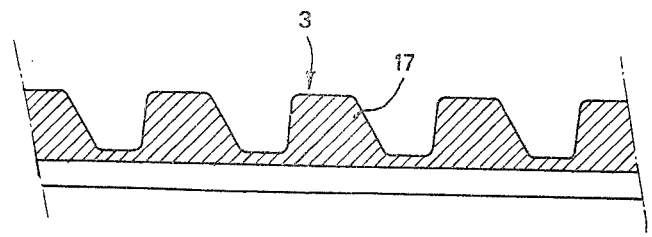
Figure 6:
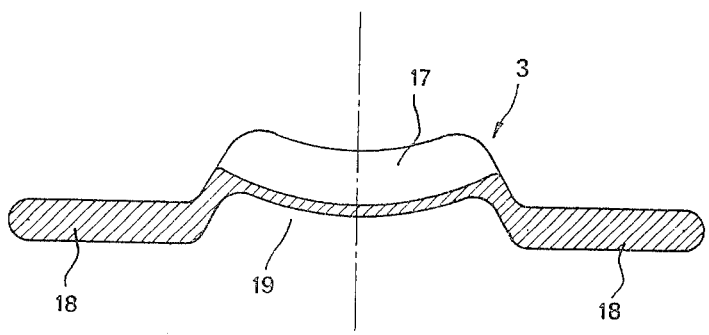
Figure 8:
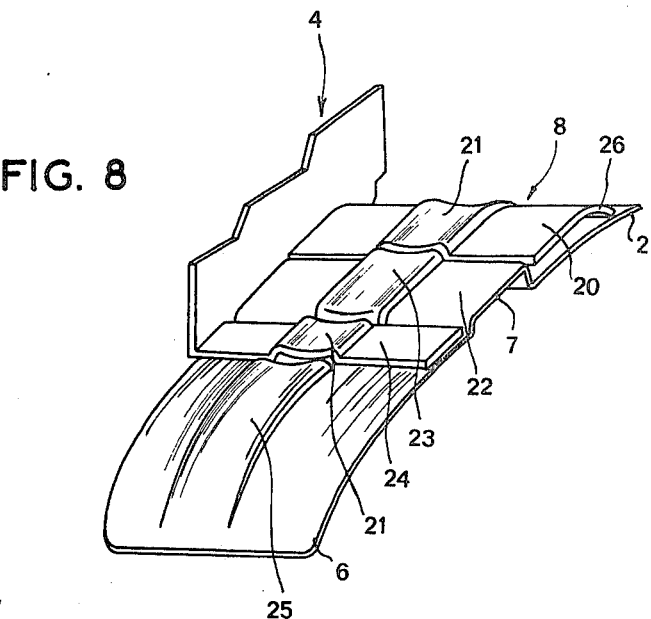
Figure 4:
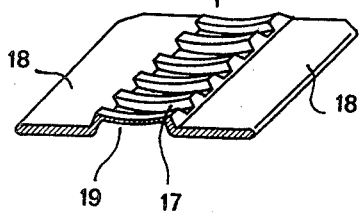
Figure 7:
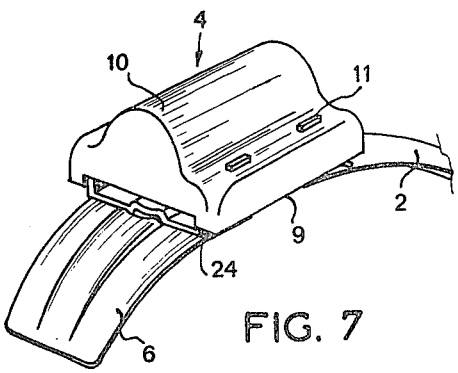
Figure 9:
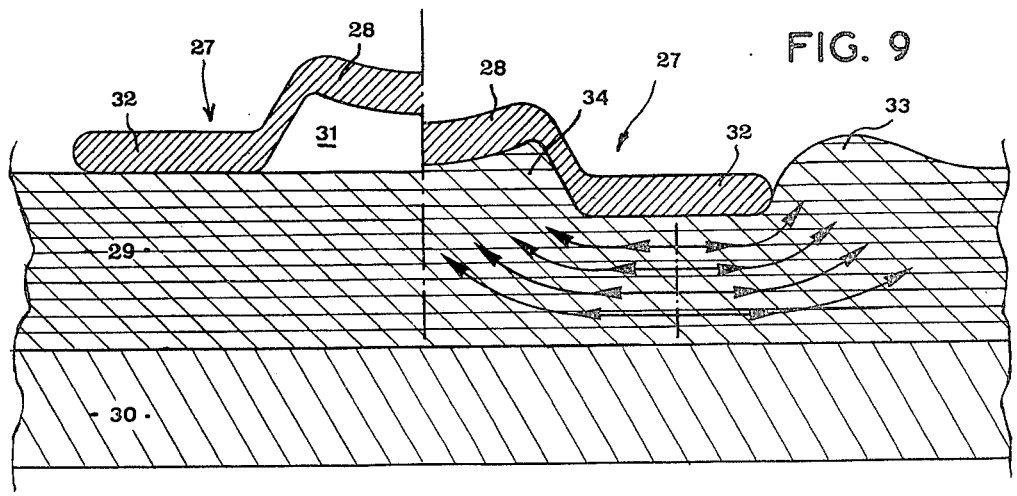

FIG. 1 is a diagram showing the relationships of clamp rings according to the prior art, FIG. 2 is a side view of a clamp ring embodying the invention, FIG. 3 is a view of part of the ring of FIG. 2, on a larger scale, with the housing which carries the screw being shown in cross-section, FIG. 4 is a perspective view of part of the raised shaped portion of the strip of the ring, in the strip portion which forms the rack, FIG. 5 is a corresponding longitudinal sectional view, FIG. 6 is a view in cross-section, FIG. 7 is a perspective view of the housing viewing on to the end at which the strip passes into the housing, FIG. 8 is a view on a larger scale showing the guide shaping provided in the base of the housing and FIG. 9 is a view in cross-section of a shaped strip of a ring.

In FIG. 2, a clamp ring 1 comprises a metal strip 2 which towards one end is provided with ridges 3 and which toward its other end carries a housing or casing 4. A clamping screw 5 is rotatably mounted in the casing 4. This end portion of the strip 2 extends beyond the casing, to form a bib portion 6 which is interposed between the pipe or the other object around which the ring is fitted, and the ridged part of the strip 2. FIG. 3 more particularly shows that the strip 2 is connected to the base 8 of the casing by an offset portion 7 of the strip 2 bridged over a bar member 9, whereby this connection requires neither welding, nor crimping, nor any particular hooking action. The casing is completed by an upper portion 10 forming the housing for receiving the screw 5. The two portions 8 and 10 of the casing 4 are joined together by rivetting, for example at four points, as indicated at 11, FIG. 7. This mode of construction provides for a good degree of resistance to deformation of the casing, while facilitating the operation of fitting the screw 5 in place.

The point at which the casing 4 is fixed to the strip 2 is so determined that, as is best shown in FIG. 3, the first operative screwthread 12 of the screw 5 is disposed substantially in a dimetral plane X—X of the ring in the position of use, the axis Y—Y of the screw being in principle perpendicular to the above-mentioned diametral plane. The base 8 of the casing 4 is also so shaped as to provide a rectilinear support for the strip 2, in its portion which carries the ridges 3, the rectilinear support portion extending parallel to the axis Y—Y of the screw and extending over substantially the entire length of the screwthreads thereof.

Thus, as will be seen from study of FIG. 3, the ridged portion 3 of the strip 2 is held in a straight condition parallel to the screw 5, within the casing 4, in such a way that the strip 2 co-operates with the screwthreads of the screw 5 over the entire length of the screw.

The point of engagement of the first screwthread of the screw in the diametral plane of the ring also provides for engagement of the strip 2 by the screw 5 which is directed tangentially with respect to the ring, and the force applied to the strip by the screw is solely a traction force which acts in direct alignment with the portion of the strip which is adjacent said tangent, this therefore limiting the tendency of the casing to rock and naturally holding the shaped portion of the strip in engagement with the other screwthreads of the screw.

It will also be seen from study of FIG. 3 that the end of the screw 5 bears against the front part 13 of the upper portion 10 of the casing, which thus serves as a support for the screw and carries the axial force applied at the moment of tightening the ring. This therefore prevents the head 15 of the screw from bearing against the casing 4.

At the other end of the casing, there is simply provided a cut-out portion as indicated at 14, for receving a groove in the screw 5, which groove serves simply to prevent the screw from moving backwards when the ring is being slackened.

The screw shown in the embodiment illustrated is a screw which has a hexagonal head 15, for fitting a spanner thereto. It will be appreciated however that the head may be of any other desired form. It will also be appreciated that, because the head of the screw no longer bears against the casing 4, as described above, it is possible to provide the body of the screw 5 with a hollow recess, thereby providing that the screw does not project in any manner from the casing, thus eliminating any difficulty which may be caused by such a projection. When the ring is tightened, the screw is guided over its entire length by the semi-cylindrical form of the casing.

At its end corresponding to the exit of the strip, the casing 4 of the ring has a deflector nose portion 16 which acts, when the ring is tightened, to deflect the end portion of the strip towards the ring, thus ensuring that the free end of the strip does not project excessively relative to the ring proper and thus does not give rise to difficulty or danger to the user of the ring.

The lower portion or base 8 of the casing also has at its rearward end a rounded end portion 26 which is intended on the one hand to facilitate the sliding movement of the strip, by ensuring that the strip 2 does not rub against a portion which would tend to retard its movement, and on the other hand, to strengthen the portion 8 by serving as a strengthening rib.

FIGS. 4 to 6 more specifically show the shape of the strip in its portion which co-operates with the screw. It will be seen in particular that the shaping of the strip is effected in such a way as to provide the strip with a rack 17, by stamping or pressing.

It will be noticed in particular from FIG. 4 that, in this portion of the strip 2, the rack 17 is raised relative to the plane of the strip, and that the strip thus has two planar marginal portions 18 and a central portion disposed in a plane which is displaced upwardly relative to the plane of the strip 2. With this structure, the strip 2 has a longitudinal guide groove in its lower face.

This particular form of the strip makes it possible to provide a rack in the form of a sector of a nut, as can be seen from FIG. 4 to 6, thereby improving the connection to the screw by increasing the contact surface.

In order to ensure that the strip is satisfactorily guided on the bottom of the casing, and in particular to prevent the strip from twisting under the effect of the clamping force, the bottom of the casing is provided with a raised portion similar to a slide guide means, as is best shown in FIG. 8. The raised portion is intended to co-operate with the groove 19 in the strip 2, to provide the guiding action.

If reference is now made to FIG. 8, it will be seen that the bottom of the casing has two planar marginal portions 20 and a central raised portion 21. The dimensions of the raised portion 21 substantially correspond to the dimensions of the groove 19 in the strip 2, to guide the strip 2 in the manner of a slide guide means, as indicated hereinbefore, in such a way that the strip bears against the bottom of the casing by way of this shaped portion, which thus directly supports the rack.

It will also be seen from FIG. 8 that a similar shaped portion is provided on the offset bridge portion 7 of the strip 2, thus having two marginal portions 22 and a central raised portion 23 of the same configuration as the portion 21 of the bottom 8 of the casing. The engagement of the portion 23 on the portion 21 of the bar member 19 prevents the strip 2 from sliding relative to the casing, after the offset bridge portion 7 has been formed.

At its end corresponding to the entrance of the strip into the casing 4, the casing 4 shown in the drawings is provided with a tongue portion 24 to facilitate guiding the strip 2, for its entry into the casing. In the embodiment illustrated, the shaped portion 21 of the bottom 8 of the casing extends along the tongue portion 24, which in this case does not project beyond the end of the casing.

As indicated hereinbefore, at its end carrying the casing 4, the strip 2 is provided with an extension forming a bib portion 6 which is known per se. The bib portion 6 is interposed between the pipe or the object to be clamped, and the part of the strip which carries the shaped configuration 3, in order to prevent any interference between the shaped portion 3 and the material of the pipe.

In the embodiment illustrated, the bib portion 6 is provided over a part of its length with an incipient shaped configuration 25 which is positioned in line with the raised portions 21 and 23. Thus, as soon as it comes into contact with the bib portion, the part of the strip which enters the casing is positioned in a transverse direction, thereby providing for a good guiding action for the strip for it to come into engagement with the screwthreads of the screw.

The mode of use of a clamp ring of this type is identical to use of the known rings. However, by virtue of the features described hereinbefore, the clamp ring of this type makes it possible to produce markedly higher clamping pressures, so that it can be used for clamping pipes or conduits of large diameter, under conditions which make it necessary to seal against high pressures.

FIG. 9 shows a view in cross-section on a larger scale of a clamp strip 27 which is provided in principle over its entire length with a shaped configuration 28, which may be disposed in line with the shaping of the part of the ring which forms the rack, as described above. The left-hand part of FIG. 9 corresponds to the position of the ring when it is not clamped around a pipe 29, which is made for example of rubber or a similar material, and which is fitted on to a ferrule 30. It will be seen that there is a cavity 31 between the shaped portion 28 of the strip 27 and the pipe 29 and that the strip rests against the pipe by way of two lateral 'rim portions' 32.

The right-hand part of FIG. 9 shows the ring in the clamped position. It will be seen that when the ring is tightened, the material of the pipe flows at the location of each rim portion 32 on respective sides of a plane which passes substantially through the middle of the rim portion, as indicated by the arrows. The material of the pipe thus flows outwardly of the strip at 33 and inwardly of the cavity 31 at 34. This provides both for better immobilisation of the ring in a transverse direction, and improved sealing by virtue of the material which has flowed inwardly of the cavity 31.

What is claimed is:

1. A clamp ring comprising a strip having a first and a second end portions, a series of transversely extending ridges or like profiles provided at said first end portion of said strip, a housing carried towards said second end portion of said strip, and a screw rotatably mounted within said housing and having screw threads engaged with said ridges of said strip to provide for tightening of said ring, said ridges being in the shape of a rack provided on a central portion of the strip which is outwardly offset with respect to side portions of the strip and which provides a guide groove in the lower face of said strip, and a raised shaped portion provided on the bottom of said housing and slidably engaged in said guide groove of said strip.

2. A clamp ring according to claim 1, wherein said strip comprises, a planar surface on each side of said groove, said two planar surfaces being located in the same plane, and wherein said bottom of said housing comprises a planar surface on each side of said raised shaped portion, said planar surfaces of said strip resting on said planar surfaces of said housing bottom.

3. A clamp ring according to claim 1, wherein said housing is secured to said strip through an offset bridge portion of said strip bridging a portion of said housing bottom, and wherein said raised shaped portion of said housing bottom is also provided on said offset bridge portion of said strip, thus forming a continuous guiding raised shaped portion slidably engaging with said guide groove of said strip on the whole length of said housing bottom and said offset bridge portion of said strip.

4. A clamp ring according to claim 3, comprising a tongue portion provided at the entry of said housing for facilitating entry of said strip into said housing, and wherein said tongue portion is provided with a central raised shaped portion slidably engaging said guide groove of said strip lower face, said raised shaped portion of said tongue portion forming an extension of the said raised shaped portion of said housing bottom.

5. A clamp ring according to claim 1, comprising a tongue portion provided at the entry of said housing for facilitating entry of said strip into said housing, and wherein said tongue portion is provided with a central raised shaped portion slidably engaging said guide groove of said strip lower face, said raised shaped portion of said tongue portion being an extension of said continuous raised shaped portion provided on said housing bottom and said offset bridge portion of said strip.

6. A clamp ring according to claim 1, wherein said strip end carrying said housing extends beyond said housing while forming a bib portion, said bib portion being adapted to bear against an article to be clamped and being located between said article and said ridge portion of said strip, and wherein said strip end comprising said bib portion has a central raised shaped portion slidably engaged with said guide groove provided in the lower face of said strip, said raised shaped portion of said bib portion being an extension of said central raised shaped portion of said housing bottom.

7. A clamp ring according to claim 6, wherein said central raised shaped portion of said bib portion has a profile height which increases from the free end of said bib portion towards said housing.

8. A clamp ring according to claim 3, wherein said strip end carrying said housing extends beyond said housing while forming a bib portion being adapted to bear against an article to be clamped and being located between said article and said ridged portion of said strip, and wherein said strip end comprising said bib portion has a central raised shaped portion slidably engaged with said guide groove provided in the lower face of said strip, said raised shaped portion of said bib portion being an extension of said central raised shaped portion of said housing bottom and said offset bridge portion of said strip.

9. A clamp ring according to claim 8, wherein the central raised shaped portion of said bib portion has a profile height which increases from the free end of said bib portion towards said housing.

10. A clamp ring according to claim 1, wherein said housing has a rectilinear bottom and is offset with respect to a diametral plane of the clamp ring perpendicular to said housing bottom, said bottom being tangential to the circumference of said clamp ring and extending substantially from said diametral plane.

11. A clamp ring according to claim 3, wherein said housing bottom carries at its end corresponding to the exit end of said strip an inwardly bent portion forming a stiffening member for said housing bottom and said housing is provided at its exit end with a deflector nose portion, said nose portion defining with said stiffening member a guiding slot for said strip leaving said housing.

* * * * *